(12) United States Patent  
Theobold

(10) Patent No.: US 7,057,566 B2  
(45) Date of Patent: Jun. 6, 2006

(54) FLEXIBLE MULTICHANNEL WLAN ACCESS POINT ARCHITECTURE

(75) Inventor: David M. Theobold, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 37 days.

(21) Appl. No.: 10/760,331

(22) Filed: Jan. 20, 2004

(65) Prior Publication Data

US 2005/0156799 A1 Jul. 21, 2005

(51) Int. Cl.
*H01Q 1/24* (2006.01)
(52) U.S. Cl. .................... 343/702; 343/853; 455/575.7
(58) Field of Classification Search ................ 343/841, 343/853, 844, 702, 872; 455/25, 101, 272, 455/273, 562.1, 575.7
See application file for complete search history.

(56) References Cited

U.S. PATENT DOCUMENTS 5,355,520 A * 10/1994 Freeburg et al. ............ 455/507
6,539,207 B1 * 3/2003 del Castillo et al. ....... 455/90.3

* cited by examiner

*Primary Examiner*—Michael C. Wimer
(74) *Attorney, Agent, or Firm*—Tucker Ellis & West LLP

(57) ABSTRACT

A removable antenna assembly and wireless access point including the same is disclosed in which a plurality of antenna elements are provided for transmitting and receiving wireless signals over a plurality of wireless channels. A sectorized mounting structure is provided for retaining each of the plurality of antenna elements substantially in an antenna isolation configuration, so as to enable simultaneous sectorized signal communication of the antenna elements over the wireless channels. A removable network interface is provided for selectively enabling a signal connection between a radio digital interface component and the plurality of antennas.

42 Claims, 3 Drawing Sheets

FLEXIBLE MULTICHANNEL WLAN ACCESS POINT ARCHITECTURE

BACKGROUND OF THE INVENTION

The present system is directed to the field of radio communications, with particular applicability to the field of wireless networking, where mobile client devices such as wireless laptop and handheld computers are in radio communication with a network. In the field of wireless networking, it is desirable to operate a wireless local area network (WLAN) with multiple wireless channels, so as to increase throughput and thereby service a greater number of wireless clients. As a result, two-channel configurations are becoming the standard for wireless access point (AP) deployments, used to exchange signals between the network and the client. Such deployments typically include one channel in the 2.4 GHz range in accordance with the IEEE 802.11(b) or (g) protocols, and a single channel in the 5 GHz range in accordance with the IEEE 802.11(a) protocol. It is expected that throughput requirements will continue to rise and that dense wireless client user environments will become the norm, and so multichannel (three or more channel) APs rather than dual channel APs will be required.

It is difficult to anticipate the future standards of multichannel networking, and the specific needs of individual WLAN deployments will inevitably vary in accordance with customer needs. The present dual band AP designs have various advantages and disadvantages as extended to a multichannel deployment. For example, a number of dual band APs may be deployed operating on different individual channels. However, such a deployment would require multiple installations, adequate physical separation, and multiple wires back to the network connection. Also, such an approach does not address the need for deployment of multiple channels in very dense user environments such as conference rooms and classrooms. Single, high-throughput APs having three or four 802.11(a) channels are known and have been considered for dense client coverage, but these approaches are fixed in channelization, and are not sufficiently flexible to adapt to the varying needs of different end-users. Thus, there are no current solutions available that can provide a useful selection of 802.11 band types and the number of channels to be supported within each band.

SUMMARY OF THE INVENTION

The difficulties and drawbacks associated with previous systems are overcome with the present removable antenna assembly and wireless access point including the same in which a plurality of antenna elements are provided for transmitting and receiving wireless signals over a plurality of wireless channels. A sectorized mounting structure is provided for retaining each of the plurality of antenna elements substantially in an antenna isolation configuration, so as to enable simultaneous sectorized signal communication of the antenna elements over the wireless channels. A removable network interface is provided for selectively enabling a signal connection between a radio digital interface component and the plurality of antennas.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

Figure 1A:
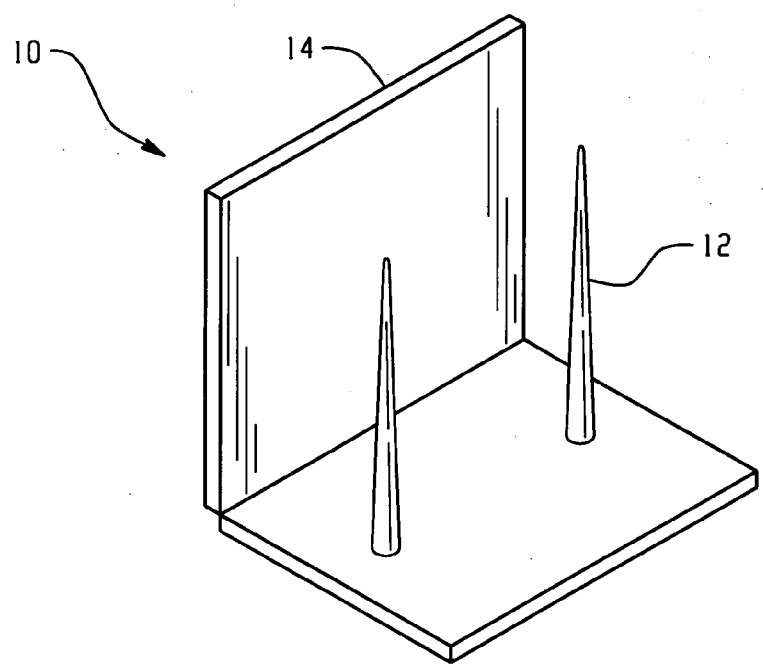
FIGS. 1A and 1B show an exemplary isolated antenna component and a directional coverage area provided thereby.

The figures generally indicate the features of the preferred embodiments, where it is understood and appreciated that like reference numerals are used to refer to like elements. As shown in FIG. 1A, a number of antenna elements 10 are provided for transmitting and receiving wireless signals over a plurality of wireless channels. The antenna elements 10 are configured so as to provide "antenna isolation" so that the signal from one antenna element 10 does not interfere with another antenna element 10. The "antenna element 10" can respectively refer either a single antenna or a pair of diversity antennas operating in conjunction.

Figure 1B:
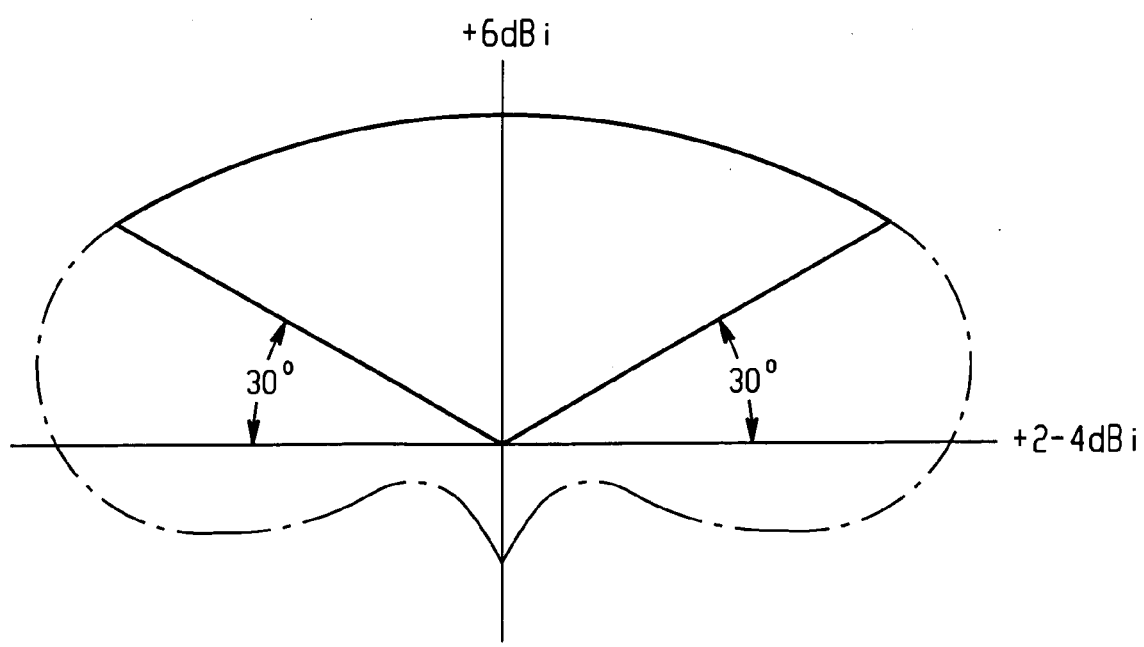

In any event, as shown in FIG. 1A, an antenna element 10 includes either a single monopole antenna 12, or diversity pair of antennas 12. Each of these antenna elements 10 may be isolated from other antenna elements 10 by using an isolating component 14, which can be a metallic vane reflector, an RF absorber material or a suitable combination thereof that would provide a desired level of signal isolation over a particular geometrical configuration. An alternative implementation might employ a patch antenna pointing outward in antenna element 10, or a pair of diversity patch antennas pointing outward, effectively combining the isolating component 14 and antenna element in the same patch antenna component. This allows respective antenna elements 10 operating over particular AP channels to coexist in proximity to one another. Likewise, the antenna(s) 12 of the antenna element 10 including a patch antenna (or diversity pair) are isolated from other antenna elements 10 by polarization and/or geometric orthogonalization. Therefore, channel isolation is effected by either of these means, or in any combination thereof, using either in a single antenna or diversity pair configuration. As shown in FIG. 1B, these arrangements provide signal isolation such that a gain on the order of +6 dBi is obtained along the axis of the antenna element's forward direction, while a gain of only +2–4 dBi is obtained on the crossover areas, 30 degrees on either side of the perpendiculars to the axis.

Figure 2A:
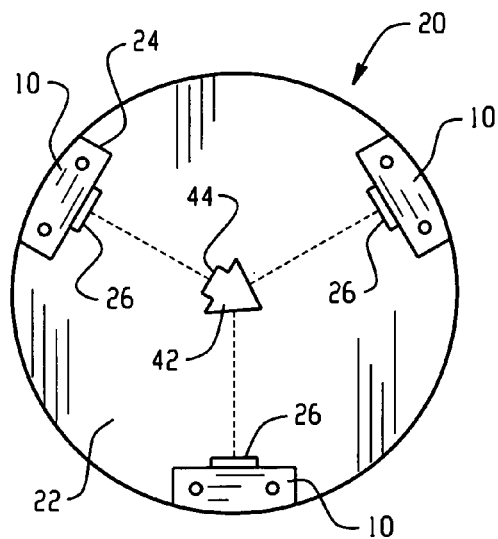
FIGS. 2A and 2B respectively show 3-way and 2-way antenna component configurations, in accordance with a preferred embodiment.
Figure 2B:
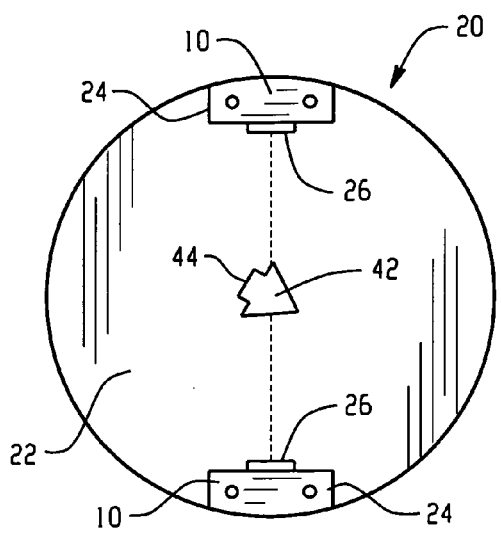

As shown in FIG. 2A, the present antenna assembly 20 is preferably a sectorized mounting structure for retaining each of the plurality of antenna elements 10 substantially in an antenna isolation configuration. In this way, the mounting structure 20 enables simultaneous sectorized signal communication of the antenna elements over the wireless channels. As is shown in the figures, the mounting structure 20 comprises a mounting plate 22, preferably circular in configuration. The antenna elements 10 are retained along the periphery of the mounting plate 22, preferably along generally cylindrical facets 24 that perpendicularly adjoin the edge of the plate 22. As shown in FIG. 2A, there can be three facets 26 along the mounting plate 22 to respectively support three antenna elements 10 at respective angular separations of 120 degrees. Alternatively, as shown in FIG. 2B, there can be two facets 24 along the mounting plate 22 to respectively support two antenna elements 10 at respective angular separations of 180 degrees. Additionally, the facets 24 can also be used to mount the associated radio digital interface electronics components 26 for each of the respective antenna elements 10, such as the analog signal generating and receiving circuitry, thereby reducing the need for these radio digital interface electronics components to be located downstream within the access point. The antenna assembly 20 also includes one or more removable network interface 28, as shown in FIG. 4B, for selectively enabling a signal connection between a downstream radio digital interface component and antenna elements 10.

Figure 4A:
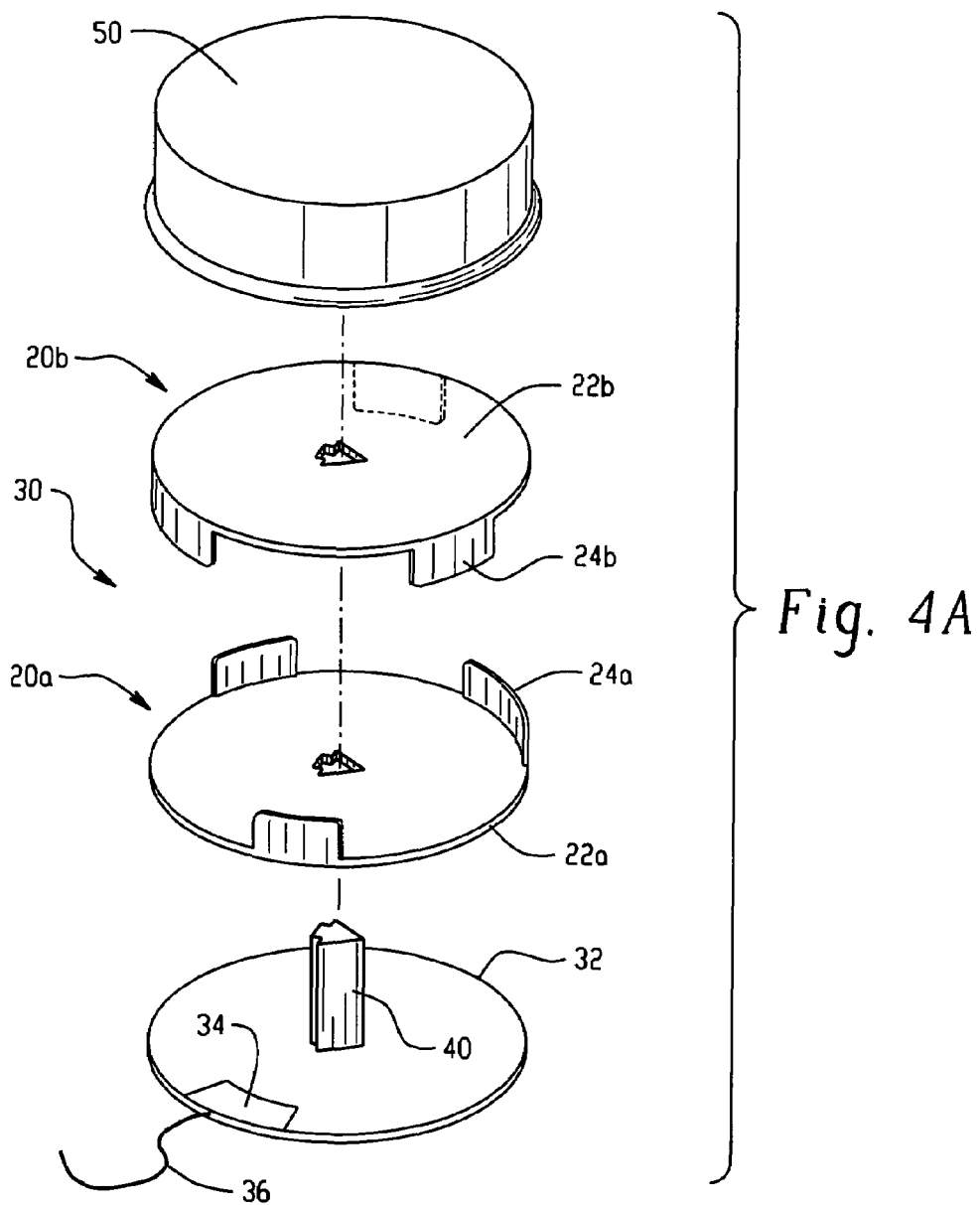
FIGS. 4A and 4B respectively show an exploded view and a block diagram of a wireless access point in accordance with a preferred embodiment.

The present antenna assembly 20 is preferably a removable component that is a part of a modular wireless communications system 10, preferably a wireless access point (AP) of the type used with a wireless local area network (WLAN). As best shown in FIG. 4A, the access point 30 includes a host component 32 that further includes a radio digital interface electronic component 34, including digital electronics, for exchanging electronic network signals with radio control signals to and from the antenna and radio elements 10. The radio digital interface component 34 can be hosted on a motherboard or other suitable device which in turn provides power and network connectivity to the antenna elements 10. The radio digital interface component 34 include a wired network connection 36 for communicating with the WLAN, preferably in accordance with a suitable protocol such as the Ethernet standards under IEEE 802.3.

Figure 4B:
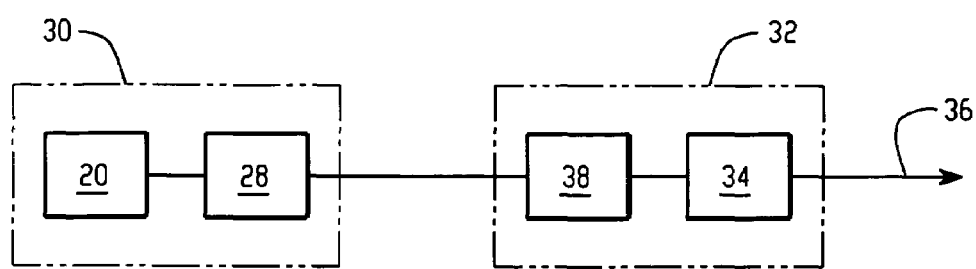

Also, as best shown in FIG. 4B, the host 32 includes one or more ports 38 for enabling a selective network connection, preferably for the antenna assembly 20. A single port 38 may be used for connecting to a single network interface 28, or alternatively, a plurality of ports 38 may be provided for connecting to a respective plurality of network interfaces 28, for each respective antenna element 10 in the access point 30. The port(s) 38 and interface(s) 28 may be suitably formed on any suitable adjoining surfaces and preferably includes a device that enables captured contact, such as a spring-loaded, interference-fit, or key-fit electrical connector or the like. It should be appreciated that the port(s) 38 and the interface(s) 28 can be configured so as to provide power to the antenna elements 10 and their respective radio components 26.

The host 32 also includes a support structure 40 for removably and modularly receiving and retaining the removable antenna element 20. As shown in FIG. 4A, the support structure 40 is generally prismatic in shape, having a suitably shaped sectional profile to preclude rotation of the antenna assembly 20, such as a triangular prism or the like. The antenna assembly 20 would include a suitable aperture 42 for receiving the support structure 40 therethrough. Also, the support structure 40 may optionally include a notch or fluted portion 44, or other suitable structure, formed along a longitudinal surface parallel to the prismatic axis, so as to allow only one preferred registration orientation of the antenna assembly 20. Further, the port(s) 38 and interface(s) 28 may also be suitably formed on support structure 40 and the adjoining surfaces of the aperture 42, and can include a connector that enables captured contact, and also electrical power, in accordance with the embodiment described above.

Figure 3A:
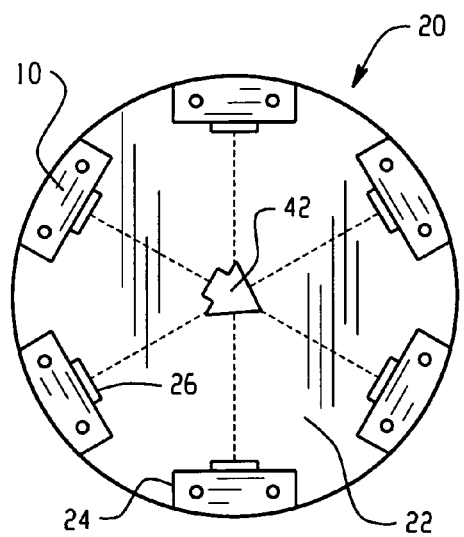
FIGS. 3A and 3B respectively show an interstitial nesting of 3-way and 2-way antenna component configurations, in accordance with a preferred embodiment.
Figure 3B:
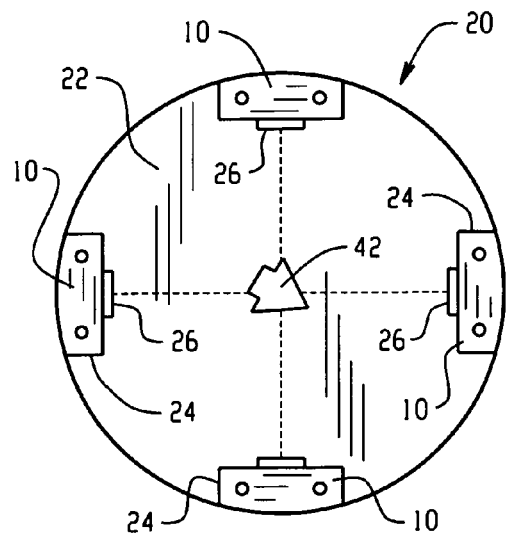

As best shown in FIG. 4A, in addition to including a single antenna assembly, the present modular system also includes a second antenna assembly 20b, which is formed to have facets 24b that nest interstitially in an inverted orientation to the facets 24a of the first antenna assembly 20a. Thus, the second antenna assembly 20b sits upside-down nested within the first antenna assembly 20a. In this way, upon nesting the first and second antenna assemblies, a number of different channels can be provided or each faceted surface. When two three-faceted antenna assemblies are nested, a six-faceted, "hexagonal" antenna arrangement is the result, as shown in FIG. 3A. Thus, six different wireless channels can be provided on a single access modular access point 30. And when two two-faceted antenna assemblies are nested, a four-faceted, "square" antenna arrangement providing four different wireless channels is the result, as shown in FIG. 3B. By selectively employing either one or both of the removable assemblies, a configurable multiple channel access point can be provided. The number of possible channels then becomes two, three, four or six depending upon the selection of antenna/RF slices and bands. Since the multiple band facets are nested interstitially, the overall height of the assembly is little more than that of a single band multichannel AP alone. Upon assembly, the entire AP assembly is preferably covered with a radome 50, formed of a material that is transparent to radio frequencies.

The present system offers many advantages over previous-type access point systems. By placing the RF electronics components with the antennas on a separate assembly, the wireless band selection becomes independent of the host electronics. Thus, it is possible to "swap out" one or both antenna assemblies 20a, 20b in order to make desired band selections for a particular WLAN configuration. For example, the first antenna assembly 20a may be configured so that each respective antenna component 10 operates on a different one of the three subchannels available in the 2.4 GHz band, in accordance with the 802.11(g) protocol. The nested second antenna assembly 20b may be configured so that each respective antenna component 10 operates on a different one of the eight subchannels available in the 5 GHz band, in accordance with the 802.11(a) protocol. Alternatively, the first and second antenna assemblies 20a, 20b can each operate different 802.11(a) subchannels. It is contemplated that the 802.11(a) band may be broadened to include 20 subchannels. The present system thus allows the flexibility to change the available subchannels over a desired coverage area, so as to provide maximum throughput with little or no "cross-talk" or other channel interference.

The Flexible Multichannel WLAN Access Point Architecture provides a means of constructing a general purpose one or two band AP with a varying number of channels within one compact envelope. The present embodiments thus enable an access point architecture that can simultaneously support multiple channels in both the 2.4 GHz and 5 GHz wireless bands, in accordance with the 802.11 protocols. The present embodiments are modular and can thereby accommodate changes in market direction and satisfy multiple deployment needs without locking the system into a fixed number of bands or channels. The present embodiments are also upgradeable, and can also preferably be upgraded in the field after installation, thereby allowing an upgrade path to subsequent configurations as throughput demand increases. Also, the flexibility of the present multichannel WLAN access point architecture reduces the number of APs to be deployed in a high throughput area, saving installation costs and number of connecting wires. Bands and number of channels can be mixed and matched to the needs of the customer by field upgrades, as needed. This is a compact solution for an upgrade, occupying the same volume independent of configuration.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

I claim:

1. A removable antenna assembly, comprising:
   a plurality of antenna elements for transmitting and receiving wireless signals over a plurality of wireless channels;
   a sectorized mounting structure is provided for retaining each of the plurality of antenna elements substantially in an antenna isolation configuration, so as to enable simultaneous sectorized signal communication of the antenna elements over the wireless channels; and
   at least one removable network interface for selectively enabling a signal connection between a radio digital interface component and the plurality of antennas;
   wherein the antenna assembly is adapted to be received on a host component comprising a radio digital interface electronic component, a wired network connection, and a port for enabling a selective network connection, so as to enable the antenna assembly to communicate with an electronic network;
   wherein the antenna assembly is one of a plurality of antenna assemblies that are received on the host component, for communicating with the electronic network; and.
   wherein the plurality of antenna assemblies comprise first and second antenna assemblies, and wherein the respective antenna elements of each antenna assembly are configured to nest interstitially in an inverted orientation with the antenna elements of the respective other antenna assembly.

2. The antenna assembly of claim 1 wherein the plurality of antenna elements comprise at least one of single antennas and diversity antenna pairs.

3. The antenna assembly of claim 1 wherein the plurality of antenna elements comprise at least one of monopole antennas and patch antennas.

4. The antenna assembly of claim 1 wherein the antenna isolation configuration comprises an isolating component selected from a group including at least one of a metallic vane reflector and an RF absorber material.

5. The antenna assembly of claim 1 wherein the antenna isolation configuration is selected from a group including at least one of a polarization configuration and a geometric orthogonalization configuration.

6. The antenna assembly of claim 1 wherein the sectorized mounting structure comprises a mounting plate, and wherein antenna elements are retained along the periphery of the mounting plate.

7. The antenna assembly of claim 6 wherein the mounting plate is circular in configuration and wherein the antenna elements are retained on generally cylindrical facets that perpendicularly adjoin a peripheral edge of the mounting plate.

8. The antenna assembly of claim 7 wherein the mounting plate comprises three facets for supporting three antenna elements at respective angular separations of 120 degrees.

9. The antenna assembly of claim 7 wherein the mounting plate comprises two facets for supporting two antenna elements at respective angular separations of 180 degrees.

10. The antenna assembly of claim 7 wherein the facets mount associated radio digital interface electronics components for each respective antenna element.

11. The antenna assembly of claim 1 wherein each respective antenna assembly comprises three antenna elements, so as to provide a hexagonal antenna arrangement upon nesting the antenna assemblies.

12. The antenna assembly of claim 1 wherein each respective antenna assembly comprises two antenna elements, so as to provide a square antenna arrangement upon nesting the antenna assemblies.

13. A wireless communications system comprising:
    a host component comprising a radio digital interface electronic component, a wired network connection, and a port for enabling a selective network connection;
    a removable antenna assembly comprising:
    a plurality of antenna elements for transmitting and receiving wireless signals over a plurality of wireless channels;
    a sectorized mounting structure for retaining each of the plurality of antenna elements substantially in an antenna isolation configuration, so as to enable simultaneous sectorized signal communication of the antenna elements ovate wireless channels; and
    at least one removable network interface for selectively enabling a signal connection between a radio digital interface component and the plurality of antennas;
    wherein the antenna assembly is adapted to be received on a host component comprising a radio digital interface electronic component, a wired network connection, and a port for enabling a selective network connection so as to enable the antenna assembly to communicate with an electronic network;
    wherein the antenna assembly is one of a plurality of antenna assemblies that are received on the host component, for communicating with the electronic network; and
    wherein the plurality of antenna assemblies comprise first and second antenna assemblies, and wherein the respective antenna elements of each antenna assembly are configured to nest interstitially in an inverted orientation with the antenna elements of the respective other antenna assembly.

14. The wireless communications system of claim 13 wherein the plurality of antenna elements comprise at least one of single antennas and diversity antenna pairs.

15. The wireless communications system of claim 13 wherein the plurality of antenna elements comprise at least one of monopole antennas and patch antennas.

16. The wireless communications system of claim 13 wherein the antenna isolation configuration comprises an isolating component selected from a group including at least one of a metallic vane reflector and an RF absorber material.

17. The wireless communications system of claim 13 wherein the antenna isolation configuration is selected from a group including at least one of a polarization configuration and a geometric orthogonalization configuration.

18. The wireless communications system of claim 13 wherein the sectorized mounting structure comprises a mounting plate, and wherein antenna elements are retained along the periphery of the mounting plate.

19. The wireless communications system of claim 18 wherein the mounting plate is circular in configuration and wherein the antenna elements are retained on generally cylindrical facets that perpendicularly adjoin a peripheral edge of the mounting plate.

20. The wireless communications system of claim 19 wherein the mounting plate comprises three facets for supporting three antenna elements at respective angular separations of 120 degrees.

21. The wireless communications system of claim 19 wherein the mounting plate comprises two facets for supporting two antenna elements at respective angular separations of 180 degrees.

22. The wireless communications system of claim 19 wherein the facets mount associated radio digital interface electronics components for each respective antenna element.

23. The wireless communications system of claim 13 wherein each respective antenna assembly comprises three antenna elements, so as to provide a hexagonal antenna arrangement upon nesting the antenna assemblies.

24. The wireless communications system of claim 13 wherein each respective antenna assembly comprises two antenna elements, so as to provide a square antenna arrangement upon nesting the antenna assemblies.

25. The wireless communications system of claim 13 wherein the host component comprises a motherboard for supporting the radio digital interface component, the wired network connection, and the port, for providing power and network connectivity to the antenna elements.

26. The wireless communications system of claim 13 wherein the wired network connection communicates with a wireless local area network, WLAN, preferably in accordance with a suitable protocol such as the Ethernet standards under IEEE 802.3.

27. The wireless communications system of claim 13 wherein the network interface comprises a plurality of network interfaces and wherein the port comprises a respective plurality of ports, for connecting with the respective network interfaces.

28. The wireless communications system of claim 13 wherein the port and the network interface is suitably formed on any suitable adjoining surfaces.

29. The wireless communications system of claim 13 wherein the port and network interface are comprised of a device that enables captured contact, selected from a group included a spring-loaded electrical connector and an interference-fit electrical connector.

30. A wireless communications system comprising:
a host component comprising a radio digital interface electronic component, a wired network connection, and a port for enabling a selective network connection;
a removable antenna assembly comprising:
a plurality of antenna elements for transmitting and receiving wireless signals over a plurality of wireless channels;
a sectorized mounting structure for retaining each of the plurality of antenna elements substantially in an antenna isolation configuration, so as to enable simultaneous sectorized signal communication of the antenna elements over the wireless channels; and
at least one removable network interface for selectively enabling a signal connection between a radio digital interface component and the plurality of antennas;
wherein the host component comprises a support structure for removably receiving and retaining the removable antenna element;
wherein the support structure is generally prismatic in shape, and has a suitably shaped sectional profile to preclude rotation of the antenna assembly; and
wherein the support structure includes a fluted portion formed along a longitudinal surface parallel to a prismatic axis, so as to allow only one preferred registration orientation of the antenna assembly.

31. The wireless communications system of claim 30 wherein the antenna assembly comprises an aperture suitably shaped for receiving the support structure therethrough.

32. The wireless communications system of claim 31 wherein the port and network interface are suitably formed on the support structure and the adjoining surfaces of the aperture.

33. A system, comprising:
a first antenna assembly comprising a plurality of antenna elements for transmitting and receiving wireless signals over a plurality of wireless channels, and a sectorized mounting structure for retaining each of the plurality of antenna elements substantially in an antenna isolation configuration so as to enable simultaneous sectorized signal communication of the antenna elements over the wireless channels; and
a second antenna assembly comprising a plurality of antenna elements for transmitting and receiving wireless signals over a plurality of wireless channels, and a sectorized mounting structure for retaining each of the plurality of antenna elements substantially in an antenna isolation configuration so as to enable simultaneous sectorized signal communication of the antenna elements over the wireless channels;
wherein the first and second antenna assemblies are configured to nest interstitially in an inverted orientation with each other.

34. The antenna assembly of claim 33, wherein the antenna elements comprise at least one of single antennas and diversity antenna pairs.

35. The antenna assembly of claim 33, wherein the antenna elements comprise at least one of monopole antennas and patch antennas.

36. The antenna assembly of claim 33, wherein the antenna isolation configuration comprises an isolating component selected from a group consisting of a metallic vane reflector and an RF absorber material.

37. The antenna assembly of claim 33 wherein the antenna isolation configuration is selected from a group including at least one of a polarization configuration and a geometric orthogonalization configuration.

38. The antenna assembly of claim 33 wherein the sectorized mounting structure comprises a mounting plate, and wherein antenna elements are retained along the periphery of the mounting plate.

39. The antenna assembly of claim 38 wherein the mounting plate is circular in configuration and wherein the antenna elements are retained on generally cylindrical facets tat perpendicularly adjoin a peripheral edge of the mounting plate.

40. The antenna assembly of claim 39 wherein the mounting plate comprises three facets for supporting three antenna elements at respective angular separations of 120 degrees.

41. The antenna assembly of claim 39 wherein the mounting plate comprises two facets for supporting two antenna elements at respective angular separations of 180 degrees.

42. The antenna assembly of claim 40 wherein the facets mount associated radio digital interface electronics components for each respective antenna element.

* * * * *